(12) United States Patent
Song et al.

(10) Patent No.: US 12,405,461 B2
(45) Date of Patent: Sep. 2, 2025

(54) METHOD OF DETERMINING AND MAINTAINING SCANNING CONDITION FOR OPTIMAL LISSAJOUS SCANNING

(71) Applicant: DAEGU GYEONGBUK INSTITUTE OF SCIENCE AND TECHNOLOGY, Daegu (KR)

(72) Inventors: Cheol Song, Daegu (KR); Jintaek Im, Sacheon-si (KR)

(73) Assignee: DAEGU GYEONGBUK INSTITUTE OF SCIENCE AND TECHNOLOGY, Daegu (KR)

(*) Notice: Subject to any disclaimer, the term of this patent is extended or adjusted under 35 U.S.C. 154(b) by 500 days.

(21) Appl. No.: 17/947,533

(22) Filed: Sep. 19, 2022

(65) Prior Publication Data

US 2023/0106944 A1    Apr. 6, 2023

(30) Foreign Application Priority Data

Sep. 17, 2021   (KR) ......................... 10-2021-0124891

(51) Int. Cl.
*G02B 26/10* (2006.01)
*G01S 7/481* (2006.01)

(52) U.S. Cl.
CPC .......... *G02B 26/101* (2013.01); *G01S 7/4817* (2013.01)

(58) Field of Classification Search
CPC ............................ G02B 26/101; G01S 7/4817
See application file for complete search history.

(56) References Cited

U.S. PATENT DOCUMENTS

| | | | |
|---|---|---|---|
| 10,939,802 B2 | 3/2021 | Hwang et al. | |
| 2012/0188614 A1* | 7/2012 | Azegrouz | A61B 3/1025 358/474 |

(Continued)

FOREIGN PATENT DOCUMENTS

| | | |
|---|---|---|
| CN | 113015881 | 6/2021 |
| JP | 2004-20873 | 1/2004 |

(Continued)

OTHER PUBLICATIONS

KR20200011665A—MEMS mirror and Lissajous scan driving method of the same, 7 pages. (Year: 2025).*

(Continued)

*Primary Examiner* — Tuyen K Vo
(74) *Attorney, Agent, or Firm* — LEX IP MEISTER, PLLC

(57) ABSTRACT

The present disclosure relates to a method of determining and maintaining a scanning condition for optimal Lissajous scanning. According to the present disclosure, the method includes selecting a frequency combination and a mapping time delay difference, when minimum scanning density according to the mapping time delay difference in the frequency combination within a preset frequency range for two axes is maximum, as an optimal scanning condition, and maintaining optimal scanning by applying a modulated drive phase offset to compensate for a deviation between an actual time delay difference and an optimal time delay difference selected as the optimal scanning condition due to a delay index adjusted according to an actual phase change. As described above, according to the present disclosure, a frequency combination may be more flexibly selected from a frequency combination having a decimal point in implementing Lissajous scanning. In addition, an optimal scanning condition may be determined, and scanning density (Continued)

may be continuously maintained greater than or equal to a certain level.

7 Claims, 6 Drawing Sheets

(56) References Cited

U.S. PATENT DOCUMENTS

| | | | | |
|---|---|---|---|---|
| 2012/0224235 | A1* | 9/2012 | Hanada | G02B 26/0841 |
| | | | | 358/474 |
| 2020/0348510 | A1* | 11/2020 | Hwang | H04N 23/672 |
| 2023/0051926 | A1* | 2/2023 | Druml | H03L 7/07 |

FOREIGN PATENT DOCUMENTS

| | | |
|---|---|---|
| JP | 2011-053137 | 3/2011 |
| JP | 2012-093577 | 5/2012 |
| JP | 2013-501561 | 1/2013 |
| KR | 10-1767116 | 8/2017 |
| KR | 10-2020-0011665 | 2/2020 |
| WO | 2012-101782 | 8/2012 |

OTHER PUBLICATIONS

JP2013501561A—Improvements in or related to laser scanning systems, 13 pages. (Year: 2025).*
KR101767116B1—Method of High resolution and high frame rate Lissajous scanning for MEMS laser scanner, 20 pages. (Year: 2025).*
Christopher L. Hoy et al. "Fast-updating and nonrepeating Lissajous image reconstruction method for capturing increased dynamic information." Applied optics vol. 50, No. 16 (May 23, 2011): 2376-2382.
Nathan O. Loewke et al. "Software-Based Phase Control, Video-Rate Imaging, and Real-Time Mosaicing With a Lissajous-Scanned Confocal Microscope" IEEE transactions on medical imaging vol. 39, No. 4, 1127-1137, Sep. 27, 2019.
Junya Wang et al. "Design rules for dense and rapid Lissajous scanning." Microsystems & Nanoengineering 6.1 (Nov. 16, 2020): 1-7.

* cited by examiner

METHOD OF DETERMINING AND MAINTAINING SCANNING CONDITION FOR OPTIMAL LISSAJOUS SCANNING

TECHNICAL FIELD

The present disclosure relates to a method of determining and maintaining a scanning condition for optimal Lissajous scanning, and more specifically, a method of determining and maintaining a scanning conditions for optimal Lissajous scanning, which may determine an optimal scanning condition in implementing Lissajous scanning and continuously maintain scanning density greater than or equal to a certain level.

BACKGROUND ART

Lissajous scanning is implemented by applying sine waves having different frequencies to two axes (an X axis and a Y axis), and various studies are being conducted to implement optimal Lissajous scanning. In the following description, a scanning density (SD) is an index of a degree to which a Lissajous pattern fills the entire pixel, and 100% is the maximum. In addition, a mapping phase means a phase of a sine wave used when an image is generated in software, and a drive phase means a phase of a sine wave applied to a scanner through hardware.

Related art 1 (U.S. Pat. No. 10,939,802, publicized on Mar. 9, 2020) discloses a technology that uses an integer frequency as a biaxial frequency for Lissajous scanning and adjusts a drive phase when SD is lower than a preset value in order to increase the SD in a repeating Lissajous pattern.

Related art 2 (Hoy, C. L., Durr, N.J. and Ben-Yakar, A., 2011. Fast-updating and nonrepeating Lissajous image reconstruction method for capturing increased dynamic information. Applied optics, 50(16), pp.2376-2382.) discloses a method of adjusting a frame rate (that is, an imaging speed) for a non-repeating Lissajous pattern.

Related art 3 (Loewke, N. O., Qiu, Z., Mandella, M. J., Ertsey, R., Loewke, A., Gunaydin, L. A., Rosenthal, E. L., Contag, C. H. and Solgaard, O., 2019. Software-Based Phase Control, Video-Rate Imaging, and Real-Time Mosaicing With a Lissajous-Scanned Confocal Microscope (IEEE transactions on medical imaging, 39(4), pp.1127-1137.) discloses a technology that reconstructs an image by adjusting a mapping phase in software for image distortion caused by disturbance during scanning.

Related art 4 (Wang, J., Zhang, G. and You, Z., 2020. Design rules for dense and rapid Lissajous scanning. Microsystems & Nanoengineering, 6(1), pp.1-7.) describes a conditions for biaxial frequency and phase offset for dense and fast Lissajous scanning.

However, the above-described related arts have the following limitations.

The related art 1 and the related art 4 correspond only to a repeating Lissajous pattern and do not consider a non-repeating Lissajous pattern.

In addition, the related arts 2 and 3 do not suggest a method of determining and maintaining conditions for a frequency and a phase for implementing optimal Lissajous scanning.

SUMMARY

As described above, the present disclosure provides a method of determining and maintaining a scanning condition for optimal Lissajous scanning, which may determine an optimal scanning condition in implementing Lissajous scanning and continuously maintain scanning density greater than or equal to a certain level.

According to an aspect of the present embodiment, a method of determining and maintaining a scanning condition for optimal Lissajous scanning includes selecting a frequency combination and a mapping time delay difference, when minimum scanning density according to the mapping time delay difference in the frequency combination within a preset frequency range for two axes is maximum, as an optimal scanning condition, and maintaining optimal scanning by applying a modulated drive phase offset to compensate for a deviation between an actual time delay difference and an optimal time delay difference selected as the optimal scanning condition due to a delay index adjusted according to an actual phase change.

A mapping time delay may be adjusted by a delay index of each axis, a phase of each axis may have a phase change amount determined by the delay index, and the modulated drive phase offset may be obtained by reflecting the phase change amount.

The selecting of the optimal scanning condition may include selecting the frequency combination within the preset frequency range, simulating minimum scanning density according to a mapping time delay difference of the selected frequency combination, repeating the selecting of the frequency combination and the simulating of the minimum scanning density for all frequency combinations within the preset frequency range, and selecting the frequency combination and the mapping time delay difference, when the minimum scanning density is greater than or equal to a preset value and is maximum, as an optimal frequency combination and an optimal time delay difference, respectively.

In the selecting of the frequency combination, a decimal point frequency combination having N decimal places may be selected.

The maintaining of the optimal scanning may include calculating, in real time, a deviation between the actual time delay difference and the optimal time delay difference, and applying the modulated driving phase offset to compensate for the deviation calculated in real time.

According to another aspect of the present embodiment, a method of determining a scanning condition for optimal Lissajous scanning includes selecting a frequency combination within a preset frequency range for each of two axes, simulating minimum scanning density according to a mapping time delay difference of the selected frequency combination, repeating the selecting of the frequency combination and the simulating of the minimum scanning density for all frequency combinations within a preset frequency range, and selecting a frequency combination and a mapping time delay difference, when the minimum scanning density is greater than or equal to a preset value and is maximum, as an optimal scanning condition.

According to another aspect of the present embodiment, a method of maintaining a scanning condition for optimal Lissajous scanning includes calculating, in real time, a deviation between an actual time delay difference and an optimal time delay difference selected due to a delay index adjusted according to an actual phase change, as an optimal scanning condition, and applying a modulated drive phase offset to compensate for the deviation calculated in real time.

As described above, according to the present disclosure, a frequency combination may be more flexibly selected from a frequency combination having a decimal point in implementing Lissajous scanning. In addition, an optimal scanning condition may be determined, and scanning density may be continuously maintained greater than or equal to a certain level.

DETAILED DESCRIPTION OF THE PREFERRED EMBODIMENTS

Figure 1:
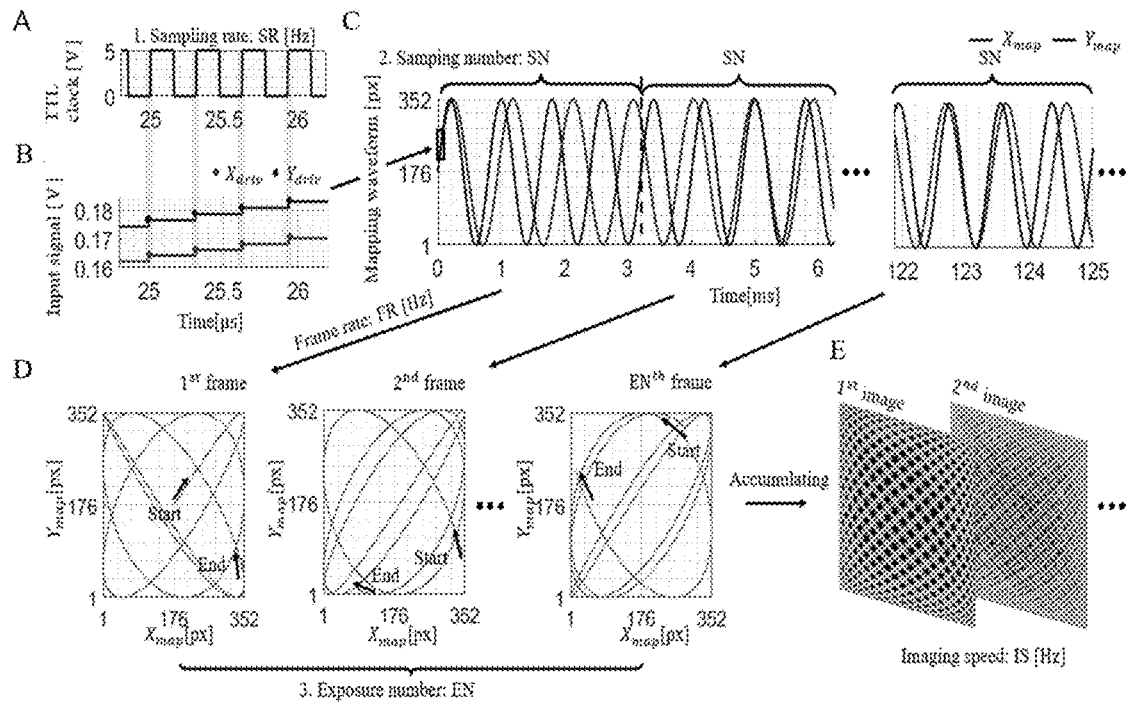
FIG. 1 illustrates imaging parameters used in Lissajous scanning.

Hereinafter, preferred embodiments according to the present disclosure will be described in detail with reference to the accompanying drawings. In this process, thicknesses of lines or size of components illustrated in the drawings may be exaggerated for the sake of clarity and convenience of description.

In addition, terms to be described below are terms defined in consideration of functions in the present disclosure, which may change depending on intentions or customs of users and operators. Therefore, definitions of the terms should be made based on the content throughout the present specification.

FIG. 1 illustrates imaging parameters used in Lissajous scanning.

Referring to FIG. 1, A illustrates a sampling rate (SR), and the SR is 3.2 MHz in a frequency of a transistor-transistor logic (TTL) clock signal.

B illustrates a sample generated in response to the TTL clock signal illustrated in A, and a new sample is generated whenever the TTL clock signal goes up from 0 V to 5 V.

C illustrates the samples illustrated in B on a wider time axis and illustrates two sine waves (an X waveform and a Y waveform) having different frequencies for forming a Lissajous pattern. When one frame is formed by using as many samples as a sampling number (SN) in the X and Y waveforms, a result as illustrated in D may be obtained. Here, SN represents the number of samples used for forming one frame.

In D, green lines in the respective frames are composed of SN data points as samples taken in the process of forming the Lissajous pattern. Here, a frame rate (FR) indicates a rate for obtaining one frame and is calculated by Equation 1 below.

$$FR=SR/SN \quad \text{[Equation 1]}$$

An exposure number (EN) indicates the number of frames to be accumulated to form one image, and a scanning pattern formed by accumulating as many frames as EN is illustrated in E. In addition, an imaging speed indicates a speed for obtaining an image and is defined by Equation 2 below.

$$IS=FR/EN \quad \text{[Equation 2]}$$

Figure 2:
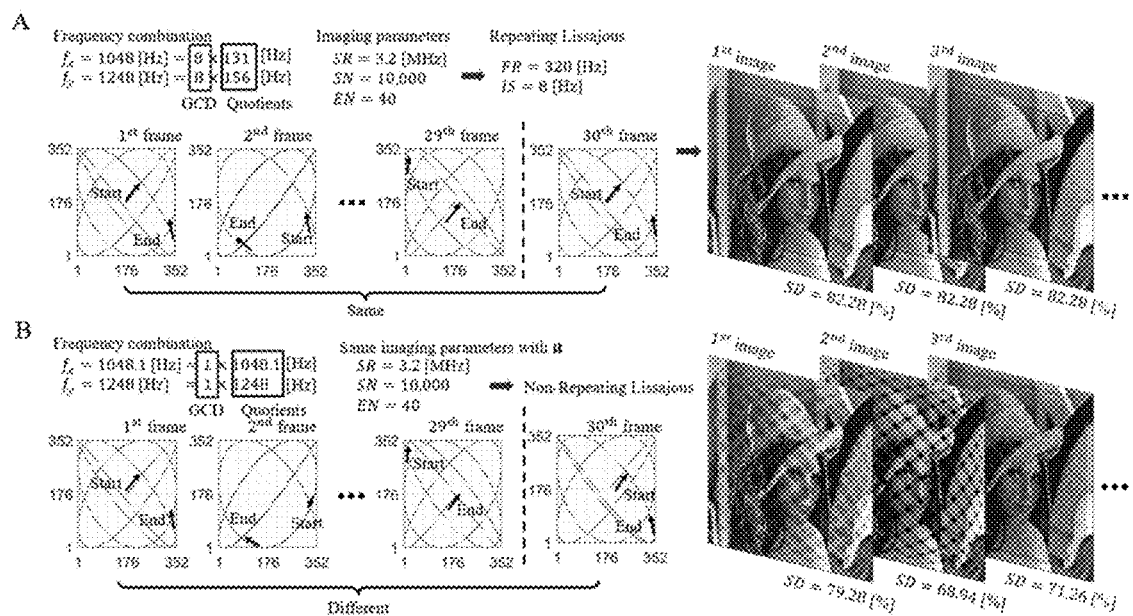
FIG. 2 illustrates a repeating Lissajous pattern and a non-repeating Lissajous pattern.

FIG. 2 illustrates a repeating Lissajous pattern and a non-repeating Lissajous pattern.

The repeating Lissajous pattern refers to a case where scanning patterns corresponding to each image are identical, and the non-repeating Lissajous pattern refers to a case where the scanning patterns corresponding to each image are different from each other.

Referring to FIG. 2, A uses 1048 Hz and 1248 Hz respectively as axis frequencies $f_x$ and $f_y$, and SR=3.2 MHz, SN=10,000, and EN=40 as imaging parameters, and according to Equation 1 and Equation 2 described above, FR=320 Hz and IS=8 Hz. The greatest common divisor of two frequencies is 8 (a red box), and when two frequencies are divided by the greatest common divisor, quotients are 131 and 156 (a blue box), and the two quotients are coprime integers. In this case, the repeating Lissajous pattern is obtained by filling 352×352 pixels in all images with scanning density (SD) of 82.28%.

B uses decimal frequencies of 1048.1 Hz and 1248 Hz as the respective axis frequencies $f_x$ and $f_y$. In this case, the greatest common divisor is 1 (a red box), and quotients are 1048.1 and 1248 (a blue box). When the same value as in A is used as the imaging parameter, the non-repeating Lissajous pattern having different scanning densities (SD) for each image is obtained.

It can be seen from FIG. 2 that all images have the same scanning density values in the repeating Lissajous pattern, but respective images have different scanning density values in the non-repeating Lissajous pattern.

In addition, even in the non-repeating Lissajous pattern, a change in scanning density may have a cycle, and the cycle of change in scanning density is referred to as a repeated image number (R).

According to an embodiment of the present disclosure to be described below, when a frequency of N decimal places with a decimal point is selected as a frequency combination for Lissajous scanning, the Lissajous pattern must be repeated every $10^N$ seconds even in the non-repeating Lissajous pattern. That is, the R value in this case is $IS \times 10^N$. For example, when a frequency with one decimal place is selected, the Lissajous pattern is repeated every 10 seconds, and a change in scanning density has a cycle of up to 80.

Figure 3:
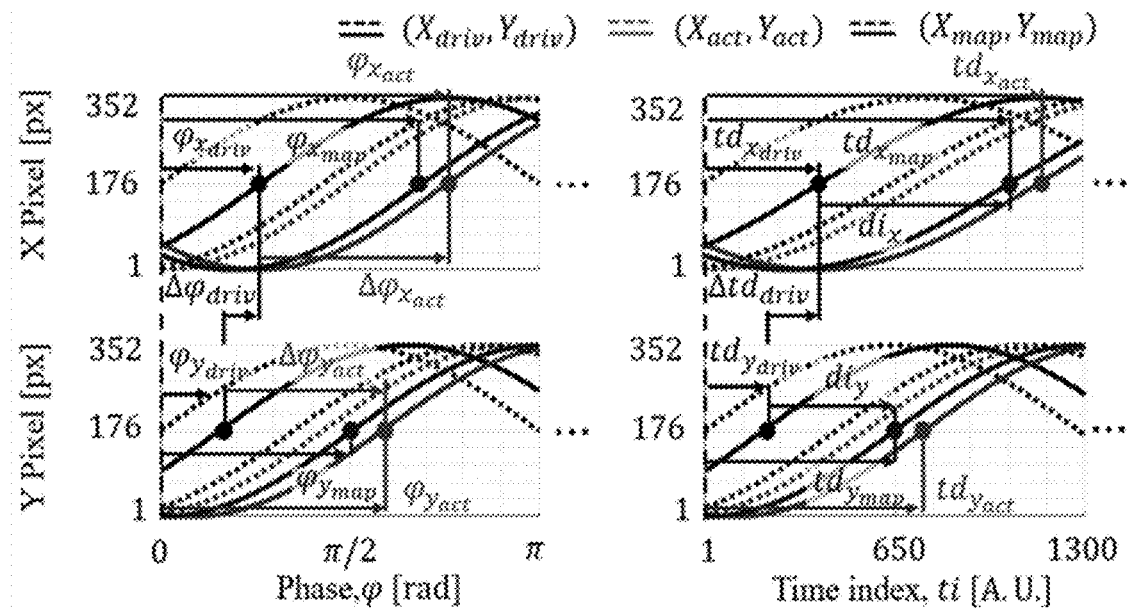
FIG. 3 illustrates concepts of a phase and a time delay in X and Y waveforms for Lissajous patterns.

FIG. 3 illustrates concepts of a phase and a time delay in X and Y waveforms for a Lissajous pattern.

Referring to FIG. 3, it can be seen that there are three types of X and Y waveforms $X_{driv}$ and $Y_{driv}$, $X_{act}$ and $Y_{act}$, and $X_{map}$ and $Y_{map}$, which are waveforms respectively for drive, actuality, and mapping. The drive waveforms $X_{driv}$ and $Y_{driv}$ represent drive voltages having the respective axis frequencies $f_x$ and $f_y$ and having phases $\Phi_{xdriv}$ and $\Phi_{ydriv}$. The actual waveforms $X_{act}$ and $Y_{act}$ are used to represent actual light paths and have respective axis frequencies $f_x$ and $f_y$ and phases $\Phi_{xact}$ and $\Phi_{yact}$. Therefore, the actual waveform has the same frequency as the drive waveform and has phase differences $\Delta\Phi_{xact}$ and $\Delta\Phi_{yact}$. The mapping waveforms $X_{map}$ and $Y_{map}$ are waveforms for image formation and have the respective axis frequencies $f_x$ and $f_y$ and phases $\Phi_{xmap}$ and $\Phi_{ymap}$. In order to obtain an accurate image, phases of the mapping waveforms are adjusted to cause $X_{map}$ and $Y_{map}$ to match $X_{act}$ and $Y_{act}$.

All waveforms are composed of a total of $SR \times 10^N$ time indices (ti∈{1, 2, . . . $SR \times 10^N$}), and a time value corresponding to each time index is ti/SR, which is a waveform for a total of $10^N$ seconds. A phase difference $\Delta\Phi$ may be represented as a time delay td value on a time index axis and may be represented as $\Phi = 2\pi f \times td/SR$. Drive time delays $td_{xdriv}$ and $td_{ydriv}$ are time delays of the drive waveforms and are used to represent drive phases. Actual time delays $td_{xact}$ and $td_{yact}$ are time delays of the actual waveforms and are used to indicate actual phases. Mapping time delays $td_{xmap}$ and $td_{ymap}$ are time delays of the mapping waveforms and are used to indicate mapping phases. In this case, the mapping time delays are adjustable through each axis delay indices $di_x$ and $di_y$, and each axis phase has a change amount of $2\pi f_x \times di_x/SR$ and $2\pi f_x \times di_y/SR$ with respect to the delay indices.

Figure 4:
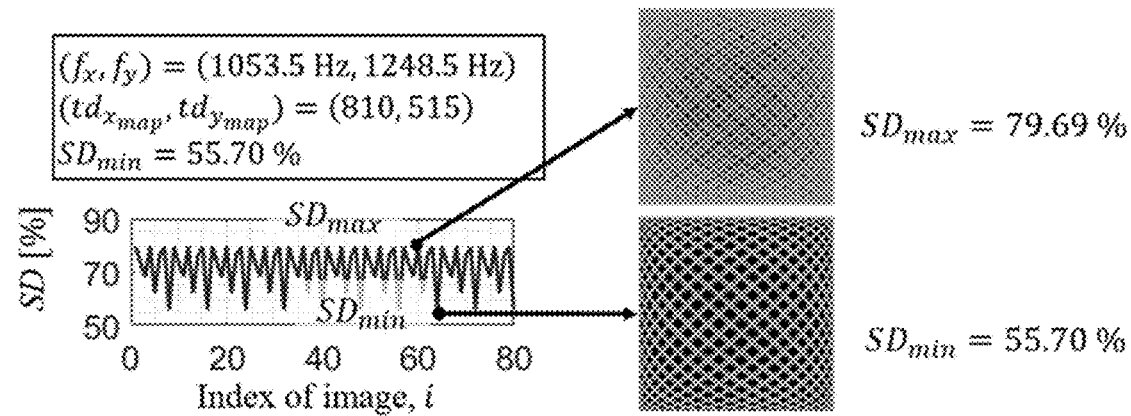
FIG. 4 is a diagram illustrating a change in scanning density in a non-repeating Lissajous pattern.

FIG. 4 is a diagram illustrating a change in scanning density in a non-repeating Lissajous pattern.

Referring to FIG. 4, for example, decimal point frequencies 1053.5 Hz and 1248.5 Hz are used as the respective axis frequencies $f_x$ and $f_y$, and when respective axis mapping time delays $td_{xmap}$ and $td_{ymap}$ are respectively set to 810 and 515, it can be seen that scanning density changed greatly for each image. For example, it can be seen that the maximum scanning density $SD_{max}$ has 79.69%, and the minimum scanning density $SD_{min}$ has 55.7%.

Figure 5:
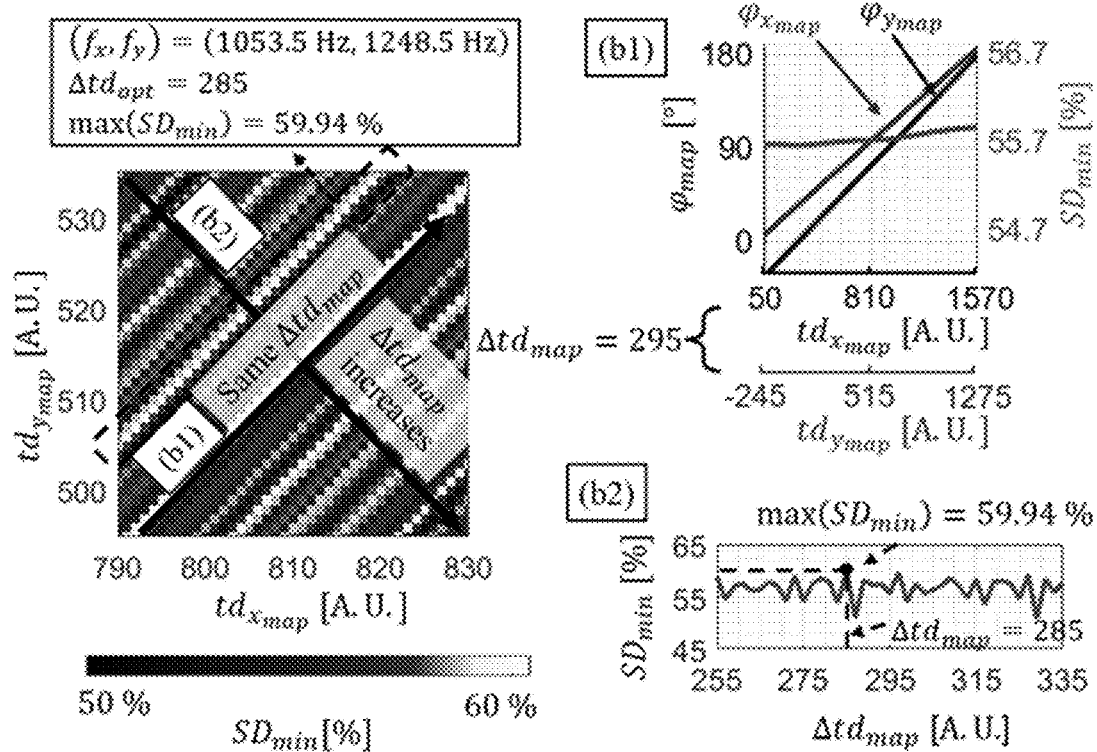
FIG. 5 illustrates a change in minimum scanning density according to a mapping time delay of each axis in a non-repeating Lissajous pattern.

FIG. 5 illustrates a change in minimum scanning density according to a mapping time delay of each axis in a non-repeating Lissajous pattern.

Referring to FIG. 5, the minimum scanning density $SD_{min}$ changes as the mapping time delay of each axis changes, and (b1) when mapping time delay differences $\Delta td_{map}$ of two axes are the same (that is, a position on a left bottom-right top diagonal), minimum scanning densities are almost the same, and (b2) as the mapping time delay differences of the two axes are different from each other (that is, a position on the upper left-lower right diagonal), the minimum scanning densities change randomly without a regular rule.

(b1) illustrates mapping phases $\Phi_{xmap}$ and $\Phi_{ymap}$ and the minimum scanning density $SD_{min}$ values for the mapping time delay values having a difference of 295. Because the mapping phase is represented as $2\pi f \times td/SR$ with respect to the time delay index, it can be seen that the respective axis frequencies $f_x$ and $f_y$ have different slopes as the frequencies $f_x$ and $f_y$ are different from each other. Because $SD_{min}$ has a change within 0.2% within a total time delay range (approximately ±90° and ±104° when converted to each mapping phase) of ±760, it can be assumed that $SD_{min}$ is constant when $\Delta td_{map}$ is the same.

As can be seen in (b2), there is a mapping time delay difference that causes the minimum scanning density $SD_{min}$ to be maximized in one frequency combination, and in the example illustrated in FIG. 5, the mapping time delay difference that allows the minimum scanning density $SD_{min}$ to be maximum is 285, and the minimum scanning density in this case is 59.94%.

The present disclosure proposes a method of maintaining scanning density greater than or equal to a certain level by finding an optimal time delay difference $\Delta td_{opt}$, which is the mapping time delay difference that allows the minimum scanning density to be maximized in each of frequency combinations.

Figure 6:
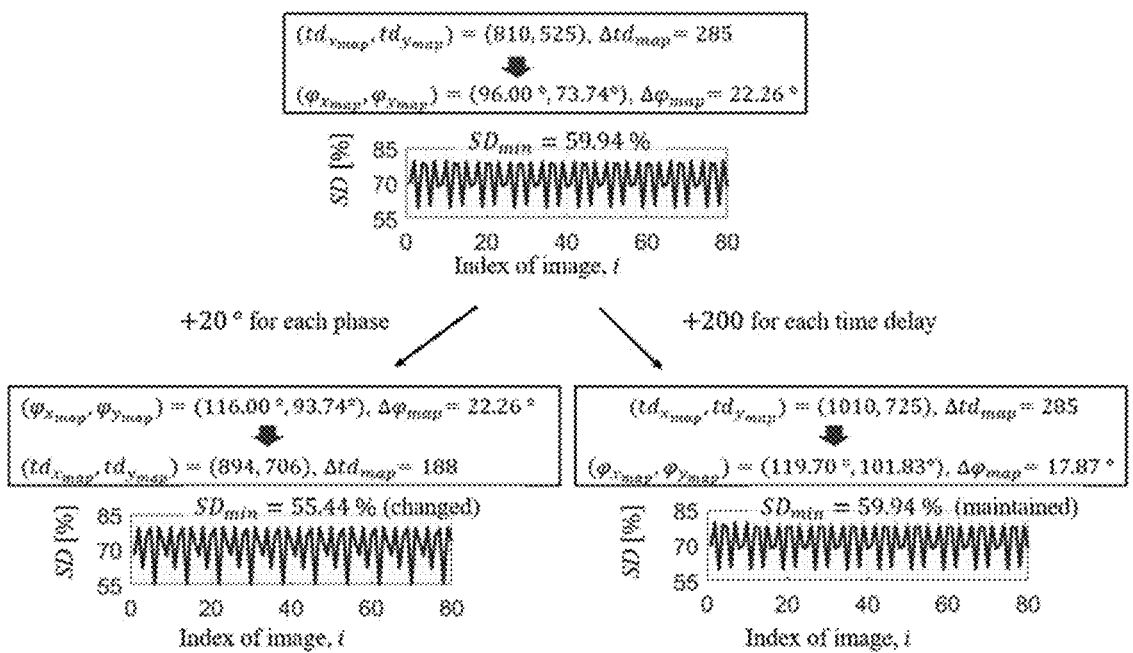
FIG. 6 is a diagram illustrating an advantage of time delay difference analysis compared with phase analysis.

FIG. 6 is a diagram illustrating an advantage of time delay difference analysis compared with phase analysis.

Referring to FIG. 6, a top graph illustrates scanning density when the optimal time delay difference $\Delta td_{opt}$ obtained in FIG. 5 is 285, and the minimum scanning density $SD_{min}$ is 59.94%. In this case, mapping time delays $td_{xmap}$ and $td_{ymap}$ are respectively 810 and 525, and mapping phases $\Phi_{xmap}$ and $\Phi_{ymap}$ corresponding thereto are respectively 96.000 and 73.74°. That is, under the optimal condition, a mapping phase difference $\Phi_{xmap} - \Phi_{ymap}$ is 22.26°.

When 20° is equally added to each mapping phase, the mapping phase difference is maintained at 22.26°, but the time delay difference is 188. In this case, as can be seen from the scanning density graph, the $SD_{min}$ value is reduced from 59.94% to 55.44%, which indicates that $SD_{min}$ is not maintained even with the same mapping phase difference.

In contrast to this, when 200 is equally added to each mapping time delay, the mapping time delay difference is maintained at 285, but the mapping phase difference is 17.87°. In this case, it can be seen that the $SD_{min}$ value is maintained at 59.94%. This means that $SD_{min}$ changes depending on each phase value even when a phase difference is obtained under the optimal condition, but when the optimal time delay difference is found, the $SD_{min}$ value is maintained as long as differences are the same as each other regardless of each mapping time delay value.

Figure 7:
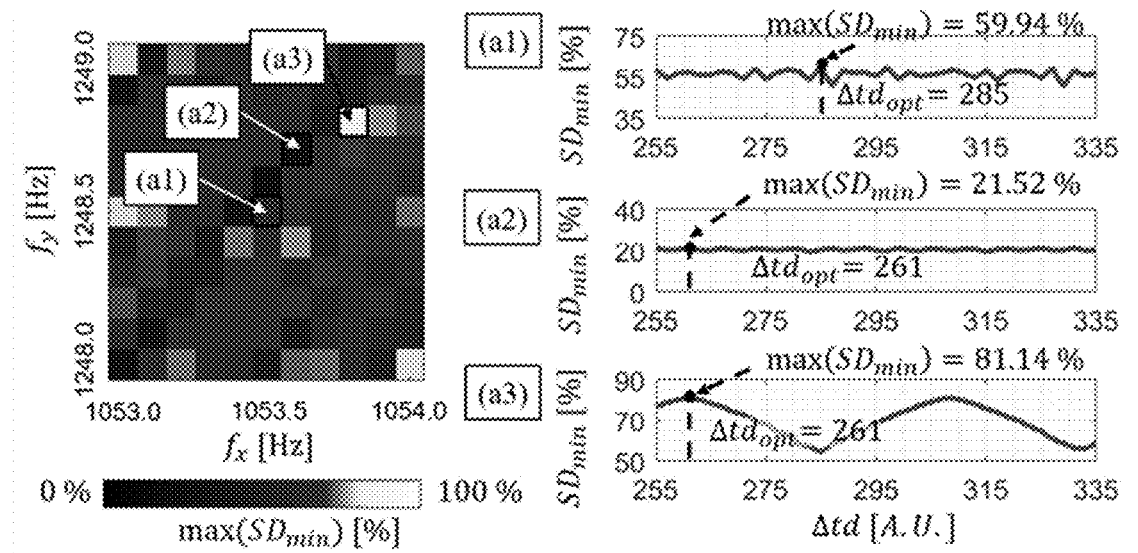
FIG. 7 illustrates a method of determining an optimal frequency combination and a time delay difference within a given frequency range, according to an embodiment of the present disclosure.

FIG. 7 illustrates a method of determining an optimal frequency combination and a time delay difference within a given frequency range, according to an embodiment of the present disclosure.

Referring to FIG. 7, (a1) is a case where each the axis frequencies are $f_x$ and $f_y$ are respectively 1053.5 Hz and 1248.5 Hz, and when the mapping time delay difference is 285, the minimum scanning density is 59.94% to the maximum.

(a2) illustrates a case where each the axis frequencies are $f_x$ and $f_y$ are respectively 1053.6 Hz and 1248.7 Hz, and when the mapping time delay difference is 261, the minimum scanning density is 21.52% to the maximum.

(a3) illustrates a case where each the axis frequencies are $f_x$ and $f_y$ are respectively 1053.8 Hz and 1248.8 Hz, and when the mapping time delay difference is 261, the minimum scanning density is 81.14% to the maximum.

That is, it can be seen that the highest minimum scanning density may be maintained when $f_x$, $f_y$, and $\Delta td_{opt}$ are respectively 1053.8 Hz, 1248.8 Hz, and 261 as in (a3).

Figure 8:
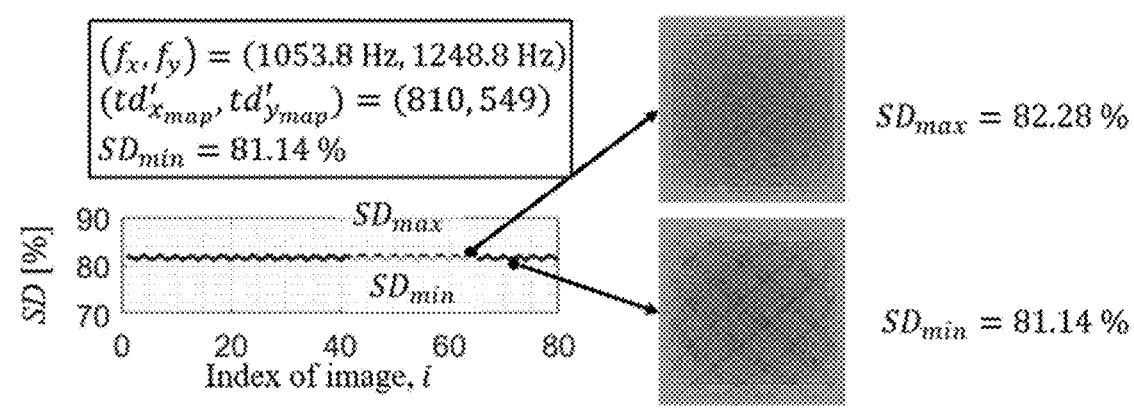
FIG. 8 illustrates a change in scanning density when the scanning condition of (a3) of FIG. 7 is satisfied.

FIG. 8 illustrates a change in scanning density when the scanning condition of (a3) of FIG. 7 is satisfied.

Referring to FIG. 8, when $f_x$, and $f_y$, and $\Delta td_{opt}$ are respectively 1053.8 Hz, 1248.8 Hz, and 261 and mapping time delays $td'_{xmap}$ and $td'_{ymap}$ of the respectively axes are respectively 810 and 549, a minimum value of scanning density is 81.14% and a maximum value is 82.28%, which indicate that excellent performance is continuously maintained without a significant change in scanning density despite a non-repeating Lissajous pattern. In this case, a pair of time delays $td'_{xmap}$ and $td'_{ymap}$) to which prime (') is attached indicates an optimal time delay difference.

Therefore, in the present disclosure, minimum scanning density according to a mapping time delay difference is simulated while changing frequencies of each axis within a given frequency range, the respective axis frequencies $f_x$ and $f_y$ and the mapping time delay difference $\Delta td_{opt}$ at the time when minimum scanning density is greatest are selected as the optimal scanning conditions, and thus, excellent performance may be provided even in the non-repetitive Lissajous scanning.

Figure 9:
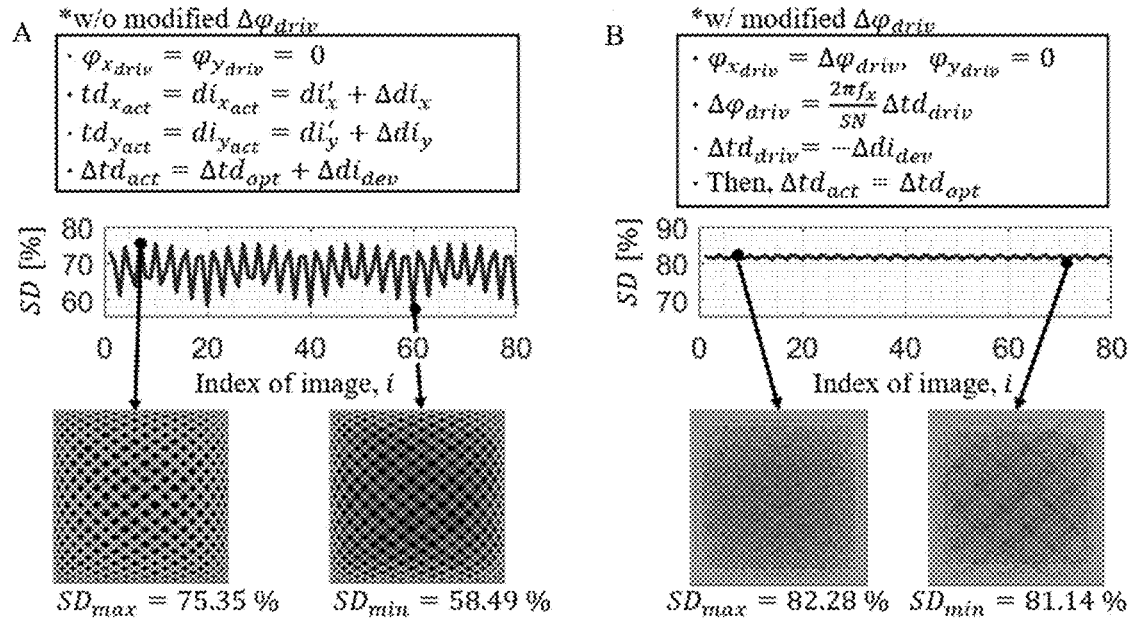
FIG. 9 illustrates a process of maintaining an optimal scanning condition in a non-repeating Lissajous pattern, according to an embodiment of the present disclosure.

FIG. 9 illustrates processes of maintaining an optimal scanning condition in the non-repeating Lissajous pattern, according to an embodiment of the present disclosure.

As disclosed in related art 3, a change in mapping phase is essential for image reconstruction, and for this purpose, a time delay index is adjusted, and thereby, a deviation occurs from the optimal scanning condition selected as described above, and this deviation affects the minimum scanning density.

A of FIG. 9 illustrates a change in scanning density when a mapping phase is changed, according to the related art 3, and actual delay indices may have a pair $di'_{xmapping}$ and $di'_{ymapping}$ and difference values $\Delta di_{xactual}$ and $\Delta di_{yactual}$ having optimal time delays of each axis determined as optimal scanning conditions. When the respective drive phases are 0, the delay index and the time delay have the same value, and thus, the time delay difference has a deviation $\Delta di_{dev} = \Delta di_{xactual} - \Delta di_{yactual}$ from the optimal value.

B illustrates results in which a drive time delay is defined as $-\Delta di_{dev}$, to compensate for a deviation $\Delta di_{dev}$, obtained in A. Here, when a y-axis drive phase is set to 0, a drive phase offset $\Delta \Phi_{driv}$ may be adjusted by adjusting an x-axis drive phase, and an actual mapping time delay difference is optimized by applying $-2\pi f \times \Delta di_{dev}/SR$ as an offset value. In other words, in the present disclosure, the deviation $\Delta di_{dev}$ between an optimal time delay difference corresponding to the predetermined optimal scanning condition and an actual time delay difference is calculated in real time, and a modulated drive phase offset ($\Delta \Phi_{driv} = -2\pi f \times \Delta di_{dev}/SR$) is applied to compensate therefor, and thus, the deviation is not affected.

B of FIG. 9 illustrates a change in scanning density a case where a drive phase offset is applied, and it can be seen that the case is the same as a case of the optimal scanning condition illustrated in FIG. 8 by applying a modulated drive phase offset.

Figure 10:
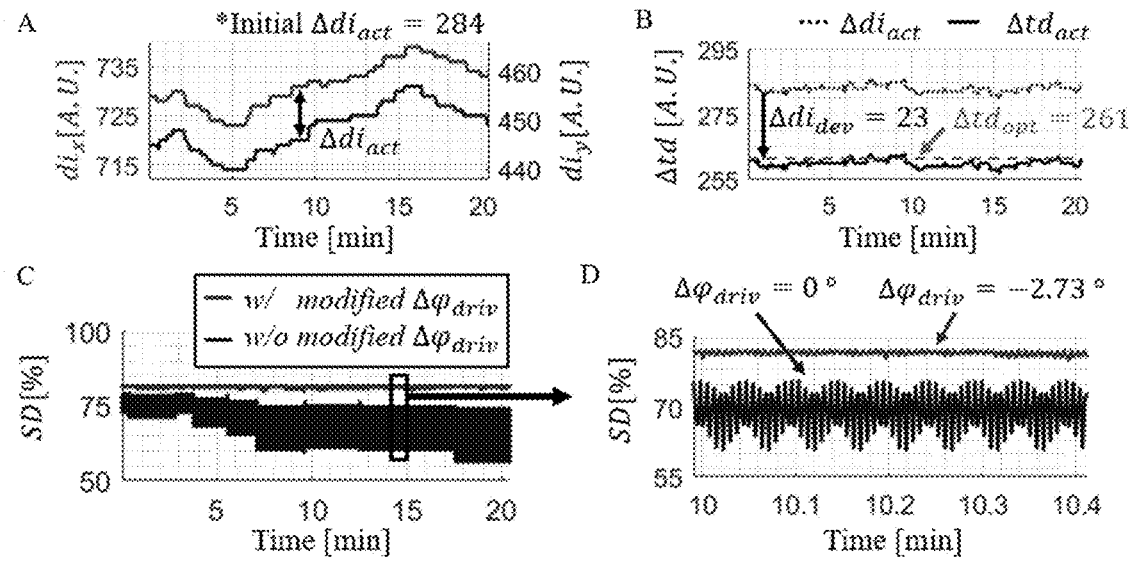
FIG. 10 illustrates experimental results of compensation for deviation of a time delay difference, according to an embodiment of the present disclosure.

FIG. 10 illustrates experimental results of compensation for deviation of a time delay difference, according to an embodiment of the present disclosure.

Referring to FIG. 10, imaging was performed while changing mapping delay indices $di_x$ and $di_y$ of each axis for about 20 minutes as illustrated in A, and delay indices at this time was modulated to represent actual phases (that is, to obtain a correct image). Accordingly, a difference in mapping delay index may be represented as an actual delay index difference $\Delta di_{act}$.

A dashed line illustrated in B indicates the actual delay index difference $\Delta di_{act}$ in this case, and there are an optimal time delay difference $\Delta td_{opt}$ and a deviation $\Delta di_{dev}$. In this case, when a modulated drive phase offset $\Delta \Phi_{driv}$ is applied, the actual time delay difference $\Delta td_{act}$ may become an optimal value.

As illustrated in C and D, when the modulated drive phase offset $\Delta \Phi_{driv}$ is applied (red, w/) and when the modulated drive phase offset $\Delta \Phi_{driv}$ is not applied (blue, w/o), it can be seen that a change pattern of scanning density has a large difference. In other words, according to the embodiment of the present disclosure, it can be seen that, when the modulated drive phase offset $\Delta \Phi_{driv}$ is applied, the scanning density is stable, and when the modulated drive phase offset $\Delta \Phi_{driv}$ is not applied, the scanning density severely fluctuates.

Figure 11:
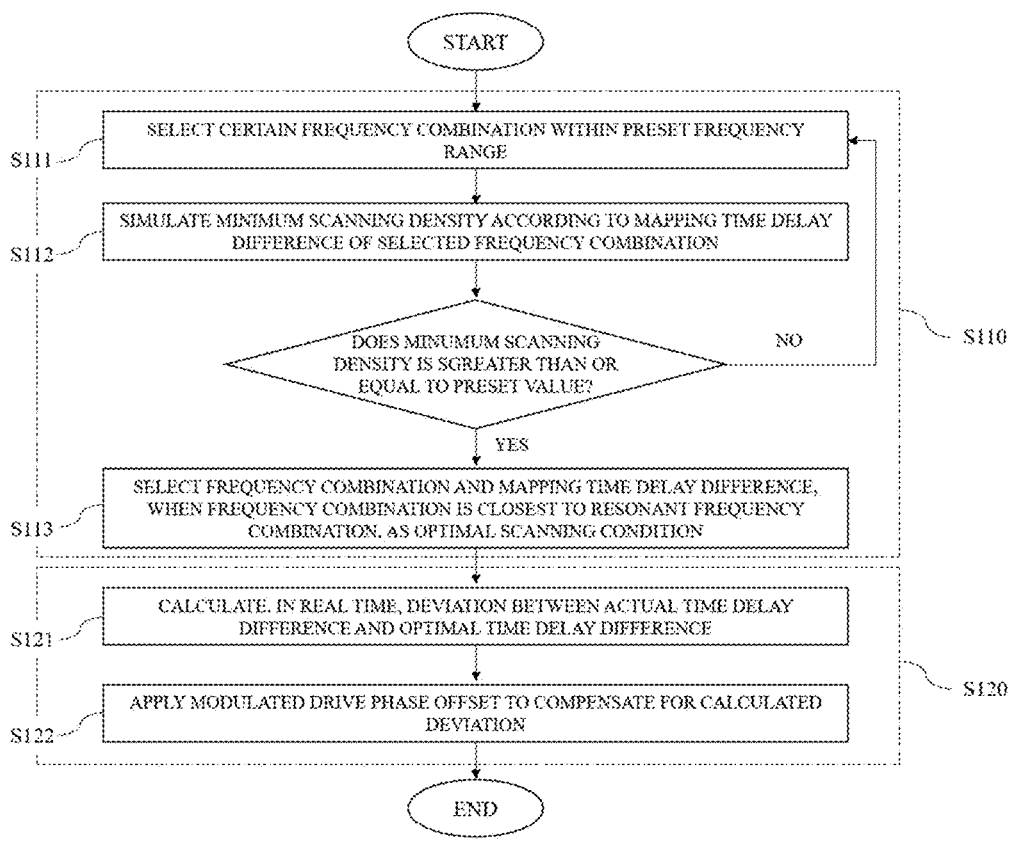
FIG. 11 is a flowchart illustrating a method of determining and maintaining scanning condition for optimal Lissajous scanning, according to an embodiment of the present disclosure.

FIG. 11 is a flowchart illustrating a method of determining and maintaining a scanning condition for optimal Lissajous scanning, according to an embodiment of the present disclosure.

Referring to FIG. 11, the method of determining and maintaining a scanning condition for optimal Lissajous scanning according to an embodiment of the present disclosure includes a step S110 of determining a scanning condition for optimal Lissajous scanning and a step S120 of maintaining optimal scanning.

In step S110 of determining a scanning condition for optimal Lissajous scanning, a certain frequency combination is selected within a preset frequency range for each of two axes (S111). Here, the frequency combination may include not only an integer frequency but also a decimal point frequency having a decimal point. In addition, in the embodiment of the present disclosure, a frequency combination of one decimal place is exemplified, but the present disclosure is not limited thereto and may be extended to N decimal places according to hardware performance.

Thereafter, minimum scanning density according to a mapping time delay difference of the selected frequency combination is simulated (S112).

Step S111 and step S112 described above are repeatedly performed for all frequency combinations within a preset frequency range. According to an embodiment, minimum scanning density according to a mapping time delay difference may be simulated for any frequency combination within the frequency range while selecting frequencies in an ascending order or a descending order of frequency within the preset frequency range for each axis. If the simulated frequency combination can provide the minimum scanning density greater than or equal to a preset value, both frequency combination and time delay difference are saved in a buffer. When step S111 and step S112 are completed for all frequency combinations within a preset frequency range, the buffer is filled with all possible frequency combinations and mapping time delay differences that can provide sufficient scanning density.

Thereafter, a frequency combination and a mapping time delay difference, when the frequency combination is closest to resonant frequency combination, are selected as an optimal scanning condition (S113).

In step S120 of maintaining optimal scanning, the deviation $\Delta di_{dev}$ between an actual time delay difference and the optimal time delay difference according to the mapping phase change is calculated in real time (S121), and a modulated drive phase offset is applied to compensate for the calculated deviation $\Delta di_{dev}$ (S122).

The method of determining and maintaining a scanning condition for optimal Lissajous scanning according to the embodiment of the present disclosure described above with reference to FIG. 11 may be performed by a processing device capable of processing an image.

According to the above-described embodiment of the present disclosure, frequencies of each axis for Lissajous scanning may be extended to a frequency having a decimal point, and thus, the number of selectable frequency combinations increases. Accordingly, it is more likely to find conditions that enable optimal Lissajous scanning by selecting a frequency combination more flexibly within a frequency range even in a scanner with a narrow bandwidth. This increases tolerance and flexibility in manufacturing a scanner.

In addition, excellent performance may be continuously maintained without significant change in scanning density by determining an optimal scanning condition even in a non-repeating Lissajous pattern, and furthermore, a deviation between an optimal time delay difference corresponding to the preset optimal scanning condition and an actual time delay difference is calculated in real time, a modulated drive phase offset is applied to compensate therefor, and thus, it is possible to greatly reduce an effect of the change in actual phase.

Although the present disclosure is described with reference to the embodiments illustrated in the drawings, which is merely examples, and those skilled in the art will understand that various modifications and equivalent other embodiments may be made therefrom. Therefore, the true technical protection scope of the present disclosure should be determined by the technical spirit of the following claims.

What is claimed is:

1. A method of determining and maintaining a scanning condition for optimal Lissajous scanning performed by a processing device, the method comprising:
    selecting a frequency combination and a mapping time delay difference, when minimum scanning density according to the mapping time delay difference in the frequency combination within a preset frequency range for two axes is maximum, as an optimal scanning condition; and
    maintaining optimal scanning by applying a modulated drive phase offset to compensate for a deviation between an actual time delay difference and an optimal time delay difference selected as the optimal scanning condition due to a delay index adjusted according to an actual phase change,
    wherein a mapping time delay is adjusted by a delay index of each axis, a phase of each axis has a phase change amount determined by the delay index, and the modulated drive phase offset is obtained by reflecting the phase change amount.

2. The method of claim 1, wherein the selecting of the optimal scanning condition comprises:
    selecting the frequency combination within the preset frequency range;
    simulating minimum scanning density according to a mapping time delay difference of the selected frequency combination;
    repeating the selecting of the frequency combination and the simulating of the minimum scanning density for all frequency combinations within the preset frequency range; and
    selecting the frequency combination and the mapping time delay difference, when the minimum scanning density is greater than or equal to a preset value and is maximum, as an optimal frequency combination and an optimal time delay difference, respectively.

3. The method of claim 2, wherein, in the selecting of the frequency combination, a decimal point frequency combination having N decimal places is selected.

4. The method of claim 2, wherein the maintaining of the optimal scanning comprises:
    calculating, in real time, a deviation between the actual time delay difference and the optimal time delay difference; and
    applying the modulated driving phase offset to compensate for the deviation calculated in real time.

5. A method of determining a scanning condition for optimal Lissajous scanning performed by a processing device, the method comprising:
    selecting a frequency combination within a preset frequency range for each of two axes;
    simulating minimum scanning density according to a mapping time delay difference of the selected frequency combination;
    repeating the selecting of the frequency combination and the simulating of the minimum scanning density for all frequency combinations within a preset frequency range; and
    selecting a frequency combination and a mapping time delay difference, when the minimum scanning density is greater than or equal to a preset value and is maximum, as an optimal scanning condition.

6. The method of claim 5, wherein, in the selecting of the frequency combination, a decimal point frequency combination having N decimal places is selected.

7. A method of maintaining a scanning condition for optimal Lissajous scanning performed by a processing device, the method comprising:
    selecting a frequency combination and a mapping time delay difference, when minimum scanning density according to the mapping time delay difference in the frequency combination within a preset frequency range for two axes is maximum, as an optimal scanning condition;
    calculating, in real time, a deviation between an actual time delay difference and an optimal time delay difference selected as the optimal scanning condition, due to a delay index adjusted according to an actual phase change; and
    applying a modulated drive phase offset to compensate for the deviation calculated in real time,
    wherein a mapping time delay is adjusted by a delay index of each axis, a phase of each axis has a phase change amount determined by the delay index, and the modulated drive phase offset is obtained by reflecting the phase change amount.

* * * * *